US006522982B1

(12) United States Patent
Pastorello et al.

(10) Patent No.: US 6,522,982 B1
(45) Date of Patent: *Feb. 18, 2003

(54) ENERGY-TO-PULSE CONVERTER SYSTEMS, DEVICES, AND METHODS WHEREIN THE OUTPUT FREQUENCY IS GREATER THAN THE CALCULATION FREQUENCY AND HAVING OUTPUT PHASING

(75) Inventors: Douglas F. Pastorello, Hudson, NH (US); Eric T. King, Temple, NH (US)

(73) Assignee: Cirrus Logic, Inc., Austin, TN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/405,370

(22) Filed: Sep. 24, 1999

(51) Int. Cl.[7] .............................................. G01B 13/02

(52) U.S. Cl. ......................... 702/61; 324/110; 341/166; 702/60

(58) Field of Search .............................. 702/57–65, 72, 702/73, 108, 118, 122, 124, 126, 183, FOR 103, FOR 104, FOR 106, FOR 109, FOR 110, FOR 134, FOR 170; 705/412, 500; 324/110; 341/166

(56) References Cited

U.S. PATENT DOCUMENTS

| | | | | | |
|---|---|---|---|---|---|
| 3,589,457 | A | * | 6/1971 | Joos | 377/22 |
| 4,463,311 | A | * | 7/1984 | Kobayashi | 324/142 |
| 4,731,602 | A | * | 3/1988 | Hata | 341/166 |
| 5,473,274 | A | * | 12/1995 | Reilly et al. | 327/159 |
| 5,485,393 | A | * | 1/1996 | Bradford | 702/60 |
| 5,764,523 | A | * | 6/1998 | Yoshinaga et al. | 702/61 |
| 5,963,074 | A | * | 10/1999 | Arkin | 327/276 |
| 6,236,197 | B1 | * | 5/2001 | Holdsclaw et al. | 324/110 |

FOREIGN PATENT DOCUMENTS

SU 711996 B * 8/1981

* cited by examiner

*Primary Examiner*—John S. Hilten
*Assistant Examiner*—John Le
(74) *Attorney, Agent, or Firm*—Blakely Sokoloff Taylor & Zafman LLP

(57) ABSTRACT

An energy-to-pulse (E2P) converter for converting analog voltage and current measurements into digital power consumption readout that has an improved output frequency range and can eliminate the potential information loss in a multiple-wires and multiple-phases power distribution system without added complex hardware. The E2P uses a threshold value T in determining the output pulse count which represents the energy/power consumption. The energy consumption E is updated every cycle of a first clock rate F1 during which a power P calculation is performed following a voltage V and a current I analog-to digital conversion. The updated energy consumption E is then divided by the threshold value T to determine the number of pulses that correspond to the power consumption. The number of pulses are output at a second clock rate F2. In so doing, more than one pulse can be generated for each P calculation thereby improving the output frequency range. To prevent complete signal overlaps that may lead to information loss in multiple-wires and multiple-phases power system, the pulse output for each wire can be programmed to have a different phase such that the pulses from the pulse outputs, which are all synchronous with each other, are non-overlapped.

23 Claims, 8 Drawing Sheets

INDUSTRIAL

ENERGY-TO-PULSE CONVERTER SYSTEMS, DEVICES, AND METHODS WHEREIN THE OUTPUT FREQUENCY IS GREATER THAN THE CALCULATION FREQUENCY AND HAVING OUTPUT PHASING

BACKGROUND

1. Technical Field

The invention generally relates to power metering and more particularly to energy-to-pulse converters having an output frequency greater than the calculation frequency and having output phasing.

2. Description of the Related Art

Electromechanical power meters have been employed in homes and businesses to monitor power consumption by particular users. Power monitoring permits utilities to monitor power (energy) usage of users to enable billing, load monitoring, servicing, and the like. Electromechanical power meters employ electrical and mechanical components including disks, gears, indicators, and dials to implement operation. Such meters are limited in accuracy, and they require frequent calibration and service by technicians to ensure their proper operation.

Electronic meters have recently begun to replace electromechanical meters in monitoring power consumption for homes and businesses. In general, because they rely on digital rather than electromechanical components, electric meters are more accurate and reliable than their counterpart electromechanical meters. Additionally, through networking, electric meters allow calibration and monitoring check-ups to be performed from a remote location such as a central office thereby greatly reducing the on-site visits by field service technicians. Finally, due to the deregulation of the electricity market already underway in the United States and Europe, broader range of information on consumers' power use is needed by competing power suppliers for customizing the billing and servicing plan for each consumer. Due to these advantages, in the near future, digital meters may replace many of million electromechanical power meters that are in use today in industrial and residential applications.

A common feature in electronic (digital) power meters is energy-to-pulse conversion (E2P) wherein the frequency (i.e., number of signal pulses per second) generated is proportional to the power consumption. Accordingly, the energy consumption can be determined by monitoring the number of pulses generated. Such conversion is generally performed using an analog-to-digital converter (ADC). Typically, in any ADC, a number of clock cycles are required to process and produce one conversion result. For example, a conversion (e.g., from voltage or current into a digital value) rate of 4 KHz may be expected from a clock rate of 1 MHz. It is desirable to improve the output frequency range making the system applicable to a wider range of applications and allowing for more accurate measurements in less time. A low conversion rate is generally undesirable because it limits the range of applications and requires more time for an accurate measurement. An improved range may be desirable because it provides the flexibility to accommodate the different requirements of different power meter Original Equipment Manufacturers (OEM) such as Schlumberger, General Electric, Siemens, etc. all at once. A power meter OEM may want a high frequency to allow for fast calibration. Another power meter OEM may want a slow frequency to drive a stepper motor to turn an indicator to show energy consumption which cannot operate at high frequencies.

FIG. 1 illustrates the steps in a traditional E2P conversion technique. In step 105, voltage (V) and current (I) measurements are first converted into digital values. Next, the total consumed energy (E) is updated (step 110). This is accomplished by adding the current energy consumption E to the power calculation (P=V*I). The updated energy consumption E is then compared against an energy threshold (T) whose value determines the frequency range (step 115). In general, the threshold value is inversely correlated to the E2P frequency which means that the higher the threshold, the lower the E2P frequency, and vice versa. If the energy consumption E reaches the threshold T, a single pulse representing the energy threshold T is output (step 120). Next, the energy consumption E is again updated by subtracting a value equal to the energy threshold T from the present energy consumption E (step 125). Step 105 is then repeated to add a new P value (with new V and I conversions) to the present energy consumption E and the process continues. Otherwise, if the energy consumption E has yet to reach the threshold T, step 105 is repeated to add a new P value (with new V and I conversions) to the present energy consumption E and the process continues.

Using this technique, there is at most one pulse produced per power P calculation. Accordingly, if the voltage and current conversion rates are at 4 KHz as discussed in the earlier example, the output pulse frequency is limited to at most 4 KHz. However, it may be desirable to increase the E2P output pulse counts per P calculation (i.e., per clock cycle) over that of the traditional technique to improve the range of output frequency thereby allowing a wider range of applications. Having the ability to output pulses at a greater rate than the conversion rate also affords more accurate measurements in less time.

In U.S. Pat. No. 5,760,617 issued to Coln et al., an interpolator is implemented between an ADC and a digital-to-frequency converter to increase the sampling rate of the digital words generated by the ADC prior to providing the digital words to the digital-to-frequency converter. The interpolator increases the sampling rate from a first clock rate $f_1$ to a second clock rate $f_2$. Accordingly, such interpolation may be used to improve the accuracy of the analog-to-digital conversion. Furthermore, the interpolation process may increase the digital-to-frequency's output pulse counts since virtual data points are added between two actual conversion data points from the ADC. However, an interpolator may be a rather complex and expensive piece of hardware, especially for high-order interpolation.

For industrial power distribution, some electric/power utilities may utilize a three-wire system, each carrying a signal with a different phase, for the purpose of power efficiency. Information from these three wires may be converted into pulse counts and then simply combined to provide the total power consumption. There is a potential of information overlap. More particularly, the pulses of the signals from the three wires may completely overlap each other (e.g., received concurrently) thereby causing a potential loss of information when they are combined unless the data from the three signals are properly separated. To separate the three streams of data from the three wires, a rather complex interface circuit has traditionally been used. The three streams of data are subsequently provided as input to a micro-controller to sum up the total pulse counts which represent the total energy consumption. Such traditional approach required complex hardware (e.g., interface circuit and micro-controller) and is therefore costly to implement.

Thus, a need exists for an apparatus, system, and method to increase the E2P output pulse counts per P calculation (i.e., per clock cycle) to improve the range of output frequency without added complex and expensive hardware. A need also exists to eliminate the potential information loss in multiple-wire or multi-phase power distribution systems without added complex hardware.

SUMMARY OF THE INVENTION

According to the present invention, the E2P output pulse counts per P calculation (per clock cycle) is increased, to improve the range of output frequency and to eliminate potential information loss in a multiple-wire and multiple-phase power distribution system, without requiring additional complex hardware.

The present invention meets the above needs with an energy-to-pulse converter. The energy-to-pulse converter comprises: a computation engine coupled to the first ADC and the second ADC and a converter circuit coupled to the computation engine. The computation engine is clocked at a first clock frequency F1. The computation engine computes a power P value from a first plurality of bits representing current and a second plurality of bits representing voltage. The computation engine monitors an energy consumption E using the computed power P value. The computation engine determines a number of pulses N corresponding to the power P value by dividing the energy consumption E by a threshold T value. The converter circuit then outputs the number of pulses N at a second clock frequency F2. In accordance to a second aspect of the present invention, the converter circuit is programmable to output each of the number of pulses N at a selected phase.

All the features and advantages of the present invention will become apparent from the following detailed description of its preferred embodiment whose description should be taken in conjunction with the accompanying drawings.

DETAILED DESCRIPTION OF A PREFERRED EMBODIMENT OR BEST MODE OF THE PRESENT INVENTION

In accordance with one embodiment of the present invention, an energy-to-pulse converter uses a threshold value T to determine an output pulse count representative of energy consumption. The energy consumption E is updated during each cycle of a first clock rate F1 during which a power P calculation is performed following a voltage V and a current I (analog-to-digital) conversion. The updated power consumption E is then divided by the threshold value T to determine the number of pulses that correspond to the energy consumption. The number of pulses are output at a second clock rate F2. In so doing, more than one pulse can be generated for each P calculation thereby improving the output frequency range making the part applicable to a wider range of applications and allowing for more accurate measurements in less time. According to another embodiment of the present invention, to prevent total signal overlaps that may lead to information loss in multiple-wire and multiple-phase power systems, the pulse output for each wire is programmed to have a different phase, to ensure that the pulses from the pulse outputs of other chips, which are all synchronous with each other, are non-overlapped.

Figure 1:
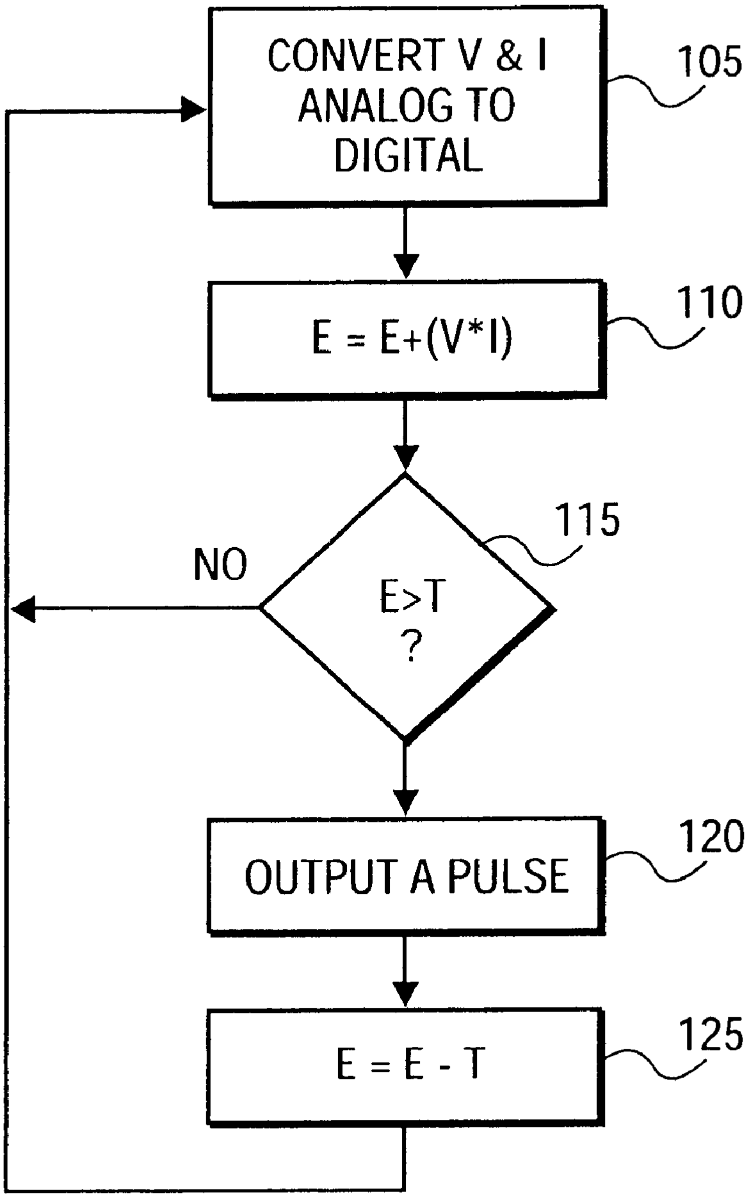
FIG. 1 (PRIOR ART)
FIG. 1 is a flow chart illustrating the steps in a traditional Energy-to-pulse (E2P) conversion technique.
Figure 2A:
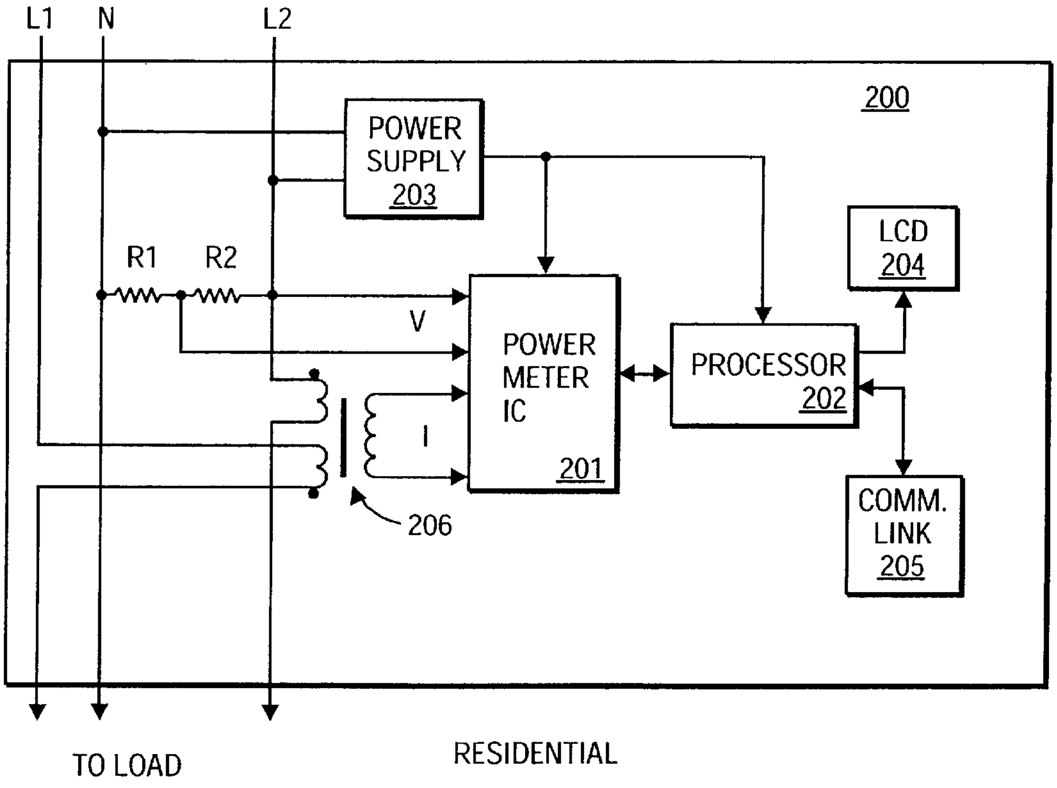
FIG. 2A is a system block diagram illustrating an overview of an exemplary residential power meter that incorporates the present invention.

Referring now to FIG. 2A, there is shown an overview of an exemplary residential power meter 200 according to the present invention. The power meter 200 includes a power meter integrated circuit (IC) 201, a processor 202, a power supply 203, a liquid crystal display (LCD) 204, a communications interface 205, and a transformer 206. The power meter 200 is designed for use in a single-phase 3-wire power system. It should be clear to a person of ordinary skill in the art that the present invention can also be incorporated into residential power meters designed for use in other types of power systems such as a single-phase 2-wire power system. Accordingly, the power system that residential power meter 200 is connected to has two load lines, L1–L2, and one neutral line that is grounded. The power signals carried by load lines L1 and L2 have the same amplitude but are opposite in phase. The differential voltage V is measured across resistor R2 which is connected with R1 in series between the neutral line and one of the load lines. The differential voltage V is then provided as an input to power meter integrated circuit 201. Differential current I is measured across the two load lines L1 and L2 via transformer 206. More particularly, transformer 206 sums together the currents drawn from lines L1 and L2 to generate differential current I which is provided as input to power meter circuit 201.

The meter integrated circuit 201 which implements the present invention, is configured to convert analog voltage V and current I measurements into two digital bit streams and to determine the correspondent power consumption (P=V*I). Power meter circuit 201 is powered by power supply 203 which draws its operating power from line L2 and the neutral line. Power supply 203 is also used to power processor 202. In the preferred embodiment, processor 202 is used as a bus master to transfer power consumption readout data generated by power meter integrated circuit 201 to LCD 204 and to communications interface 205. LCD 204 is used to display the readout data and communications interface 205 is used to relay the data to a portable field device or a remote location (e.g., a central station) for storage and/or analysis. Processor 202 is further used to program the configuration register located inside power meter integrated circuit 201 with data received from communications interface 205. In an alternate embodiment, processor 202 may be omitted if LCD 204 and communications interface 205 each can act as a bus master since the serial interface of power meter circuit 201 is designed to act only as a bus slave.

Figure 2B:
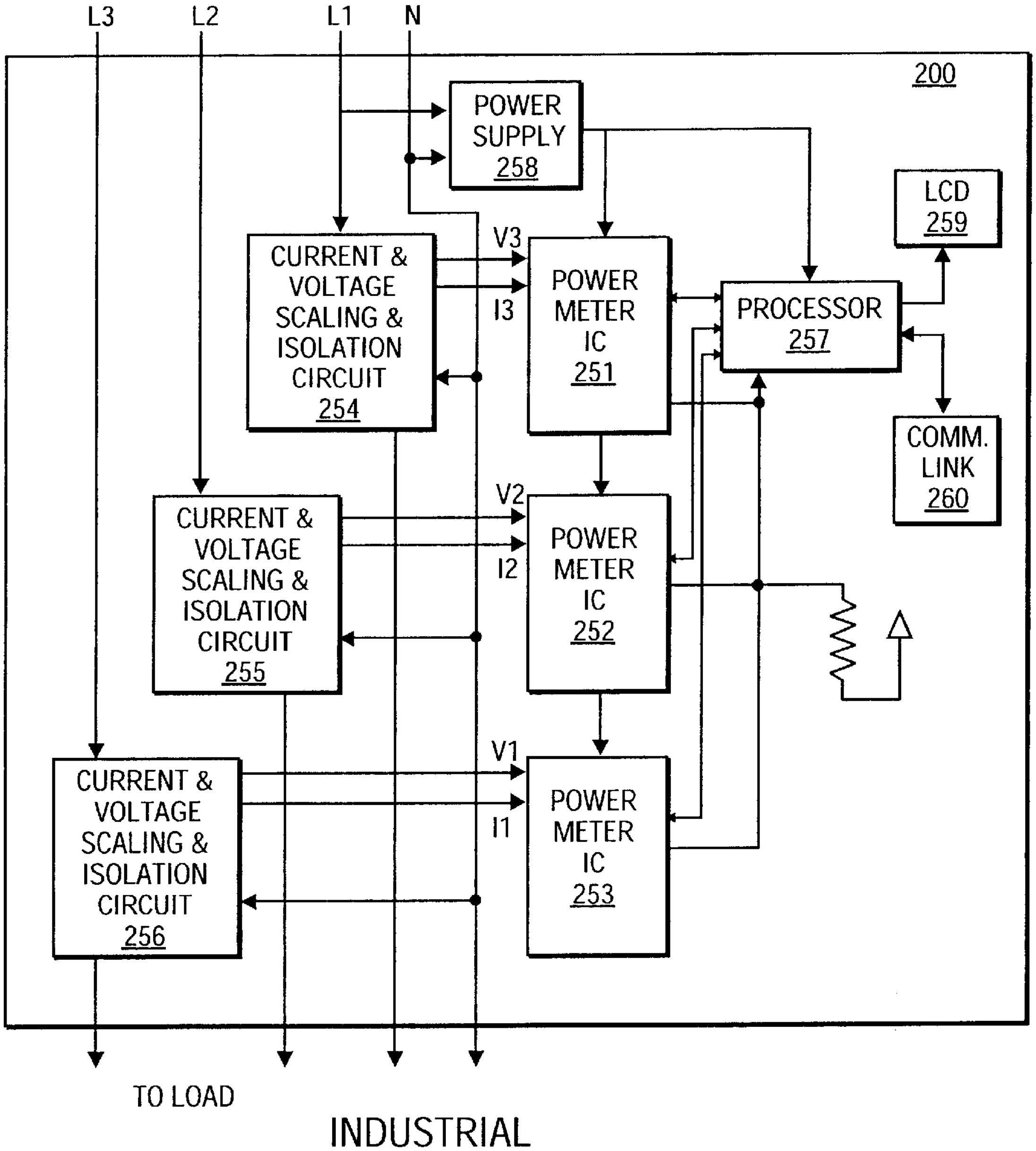
FIG. 2B is a system diagram block illustrating an exemplary industrial power meter for a multi-phases and multi-wires power system that also incorporates the present invention.

Referring now to FIG. 2B, there is shown an exemplary industrial power meter 200' that incorporates the present invention according to another embodiment. Industrial power meter 200' is particularly designed for use in a 3-phase 3-wire power system in which each line/wire is addressed separately. In particular, current and voltage measurements from each line are obtained separately, and the power consumption corresponding to each line is computed separately. Thereafter, the power consumption calculations are combined sequentially to generate the total power consumption for the three lines. The industrial power meter 200' includes first, second, and third power meter integrated circuits (ICs) 251–253, a processor 257, a power supply 258, an LCD 259, a communications interface 260, and first, second, and third current & voltage scaling & isolation circuits 254–256. Each line L1–L3 is provided as input to current & voltage scaling & isolation circuits 254–256, respectively. Each of current & voltage scaling & isolation circuits 254–256 is designed to isolate the current and voltage associated with the line connected to it as well as to scale down the current and voltage to a range that is acceptable to the power meter integrated circuit 251–253. In the preferred embodiment, the current and voltage signals output by current & voltage scaling & isolation circuits 254–256 are differential signals. Current & voltage scaling & isolation circuits 254–256 provide differential voltage and current signals V3 & 13, V2 & 12, and V1 & 11 to power meter integrated circuit 251–253, respectively. Power meter integrated circuits 251–253 generally perform the same functions as their counterpart power meter integrated circuit 201 discussed earlier. However, power meter integrated circuits 251–253 further incorporate a second aspect of the present invention wherein their outputs can be programmed to have a selected phase. In so doing, total overlapping by the signals may be prevented thereby avoiding loss of information. Processor 257 also performs the same general functions as its counterpart processor 202 discussed earlier. In addition, processor 257 processes the merged pulse signals from power meter integrated circuit 251–253. The pulse signals are combined into a single signal with the use of a pull-up resistor which is provided to processor 257 to process before passing it on to LCD 259 and communications interface 260. More particularly, the pull-up resistor, which is connected to a power supply, acts as a wired AND-gate that triggers a HIGH output only when all three pulse signals are HIGH. Power supply 258, LCD 259, and communications interface 260 perform the same functions as their counterparts power supply 203, LCD 204, and communications interface 205 which were discussed earlier and are not repeated here.

Figure 3:
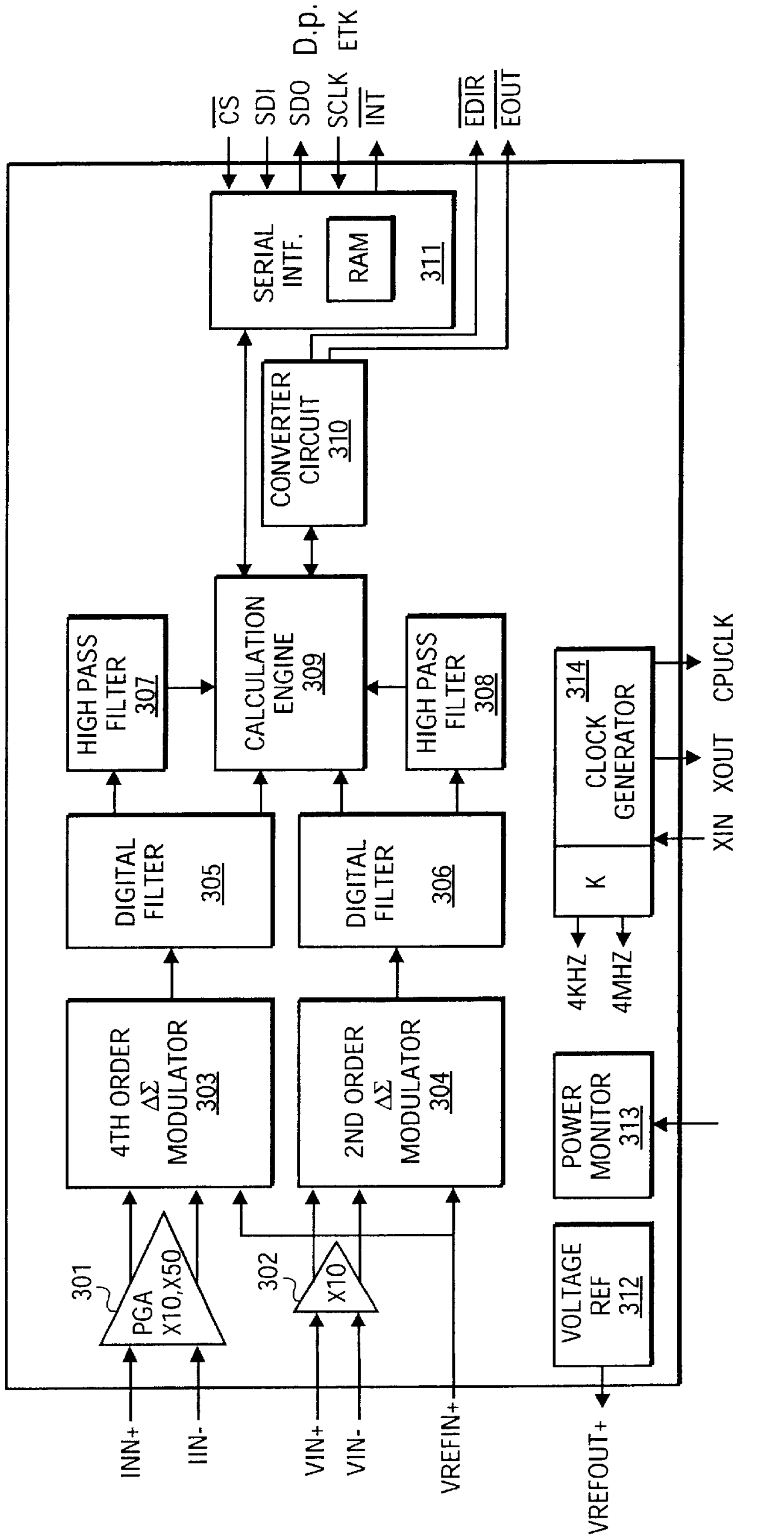
FIG. 3 is a block diagram illustrating in greater detail power meter integrated circuit or power meter integrated circuit of FIGS. 2A and 2B.

Referring now to FIG. 3, there is shown a power meter integrated circuit 201 in accordance with one embodiment of the present invention. It is to be appreciated that the below descriptions associated with FIGS. 3–6 are also applicable to power meter integrated circuits 251–253. As shown in FIG. 3, a power meter integrated circuit 201 includes a programmable gain amplifier (PGA) 301, an amplifier 302, a $4^{th}$ order Delta-Sigma (ΔΣ) modulator 303, a $2^{nd}$ order ΔΣ modulator 304, first and second digital filters 305–306, first and second high pass (HP) filters 307–308, a calculation engine 309, a converter circuit 310, a serial interface 311, a voltage reference circuit 312, a power monitor circuit 313, and a clock generator circuit 314. Differential analog current signals Iin+ and Iin− are provided as input to PGA 301 which is used to amplify the differential input signals to the range that is acceptable to $4^{th}$ order ΔΣ modulator 303. In the present embodiment, although Iin+ and Iin− are referred to as current differential inputs, they have actually been converted into a voltage differential by either a shunt resistor or a current transformer. Such conversion is made as a design choice for ease of implementation. Depending on whether a shunt resistor or a current transformer is used, a different amplifying factor is required. Accordingly, PGA 301 can be programmed to amplify the differential input current signals Iin+ and Iin− by 10× as required when the shunt resistor is used or by 50× when the current transformer is used. The amplified differential current inputs, which are in the analog domain, are then provided to $4^{th}$ order ΔΣ modulator 303 to convert into the digital domain. When analog signals are converted into digital bit streams (signals), quantization noise is introduced into the digital signals. The level of quantization noise is reduced if the ΔΣ modulator is a higher-order one. The higher the order of the ΔΣ modulator, the less quantization noise is introduced. In the present embodiment, low quantization noise level is required because the current dynamic range is so much greater than the voltage dynamic range. As a result, a $4^{th}$ order ΔΣ modulator is used to convert the analog current signal to a digital current signal. In general, ΔΣ modulation, which is well-known by a person of ordinary skill in the art, makes use of oversampling and digital signal processing to achieve a high level of accuracy in converting an analog signal into a digital signal. Using oversampling, $4^{th}$ order ΔΣ modulator 303 converts a differential input current analog signal to a digital signal wherein noise (error) is channeled away from a particular frequency band thereby allowing it to be subsequently filtered out. $4^{th}$ order ΔΣ modulator 303 also receives as input reference voltage signal Vrefin+ for comparison purpose in performing conversions. In the preferred embodiment, voltage reference circuit 312 is used to supply reference voltage signal Vrefout+ that can be connected to the Vrefin+ input pin to use as a reference signal. The digital current signal output from $4^{th}$ order ΔΣ modulator 303 is then provided as an input to digital filter 305 which is designed to downsample (i.e., decimate) the high sampling (i.e., oversampling) rate carried out by $4^{th}$ order ΔΣ modulator 303 to a lower sampling rate as well as to filter out the quantization noise and excess aliasing introduced during sampling. Digital filter 305 also converts the current bit stream from a single-bit width to a multiple-bits width. The output from digital filter 305 is then provided as input to HP filter 307 which is used to eliminate the Direct Current (DC) noise/error component from the bit stream. HP filter 307 provides its output current word to calculation engine 309. On the other hand, differential analog voltage signals Vin+ and Vin− are provided as input to amplifier 302 which is used to amplify (by ×10) the differential input signals to the range that is acceptable to $2^{nd}$ order ΔΣ modulator 304. The amplified differential voltage inputs, which are in the analog domain, are then provided to $2^{nd}$ order ΔΣ modulator 304 to convert into the digital domain. Using oversampling, $2^{nd}$ order ΔΣ modulator 304 converts a differential input voltage analog signal to a digital signal wherein noise (error) is channeled away from a particular frequency band thereby allowing it to be subsequently filtered out. $2^{nd}$ order ΔΣ modulator 304 also receives as input reference voltage signal Vrefin+ for comparison purpose in performing conversions. In the preferred embodiment, voltage reference circuit 312 is used to supply reference voltage signal Vrefout+ that can be connected to the Vrefin+ input pin to use as the reference signal. The digital current signal output from $2^{nd}$ order ΔΣ modulator 304 is then provided as an input to digital filter 306 which is designed to downsample (i.e., decimate) the high sampling (i.e., oversampling) rate carried out by $2^{nd}$ order ΔΣ modulator 304 to a lower sampling rate as well as to filter out the quantization noise and excess aliasing introduced. Digital filter 306 also converts the current bit stream from a single-bit width to a multiple-bits width. The output from digital filter 306 is then provided as input to HP filter 308 which is used to eliminate the Direct Current (DC) noise/error component from the bit stream. HP filter 308 provides its output voltage word to calculation engine 309. Calculation engine 309 performs all the computations required in monitoring the power consumption as well as determining the number of output pulses. In the present embodiment, calculation engine 309 is implemented as a state machine which is enabled at a first clock rate F1=4 KHz. It should be clear to a person of ordinary skill in the art that calculation engine 309 can also be implemented in hardware. Calculation engine 309 provides the number of output pulses to converter circuit 310 which actually supply the output pulses to pins EDIR and EOUT which in turn relays them to processor 202 for processing. Alternatively, calculation engine 309 may provide the number of output pulses directly to serial interface circuit 311 thereby bypassing converter circuit 310. In the preferred embodiment, converter circuit 310 is implemented in hardware and is clocked at 4 MHz. The output pulses generated by converter circuit 310 have a maximum allowable frequency of 2 MHz which is half the clock rate. Serial interface circuit 311 acts as an interface with processor 202 to receive serial input data via input pin SDI and to transmit serial output data to processor 202 via output pin SDO. Serial I/O data are transferred from/to serial interface circuit 311 according to serial clock SCLK which is provided from an external source. When programmable and configuration input data are received from input pin SDI, they are stored in designated registers (e.g., configuration register, etc.) in a Random Access Memory (RAM) that resides inside serial interface circuit 311. Serial interface circuit 311 also receives a chip select CS signal which is used to enable/disable the serial interface of the power meter integrated circuit 201. Serial interface circuit 311 can also generate an interrupt signal INT to processor 202 to gain its attention when necessary. Clock generator 314 is used to generate the system clock signals required for power meter integrated circuit 201. In the preferred embodiment, clock generator 314 generates at least a 4 KHz clock signal and a 4 MHz clock signal. To generate these system clock signals, clock generator 314 may be connected to a clock crystal via pins XIN and XOUT. The clock signal generated by clock generator 314 can also be used as a micro-processor clock via pin CPUCLK. Power monitor circuit 313 is used to detect a brownout condition or a power failure condition on the power system which allows power meter circuit 201 sufficient time to save critical data (e.g., present energy consumption E) before power is cut-off. As discussed above, calculation engine 309 performs all the computations required in monitoring the power consumption as well as determining the number of output pulses.

Figure 4:
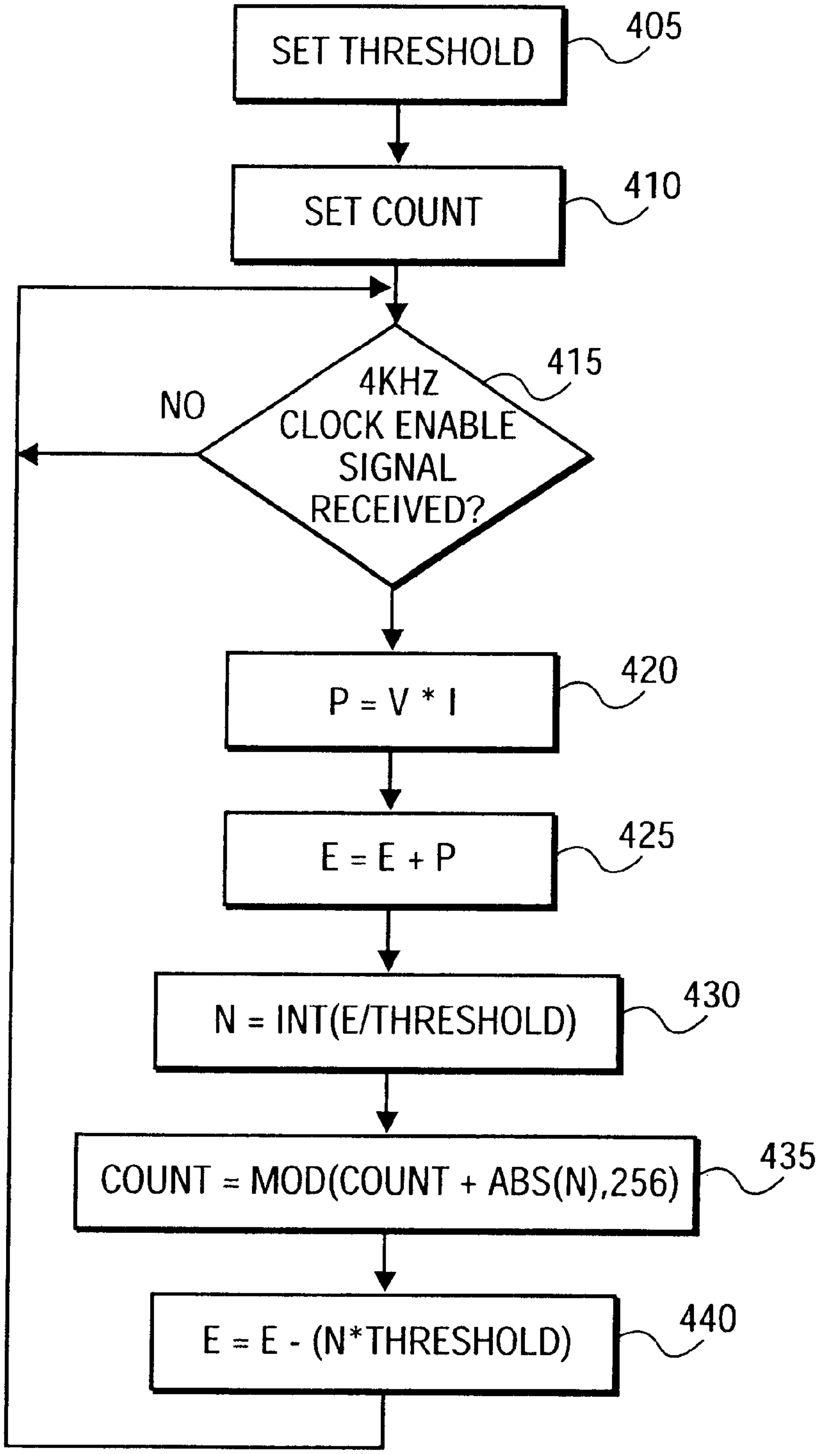
FIG. 4 is a flow chart illustrating the steps carried out by calculation engine of FIG. 3.

Referring now to FIG. 4, there is shown a method including steps carried out by calculation engine 309, according to one embodiment of the present invention. In step 405, the threshold T is set to a desirable value upon initialization. The threshold T is used in essentially determining the output frequency. More specifically, the value of threshold T is inversely proportional to the output frequency. Thus, the value of threshold T is set according to the need of the Original Equipment Manufacturer (OEM). For example, one OEM may want a high frequency output to allow for fast calibration. Another OEM may want a low frequency output to drive a stepper motor which is normally driven by a low frequency signal. In addition, the COUNT value is set to 0 (zero) upon initialization (step 410). COUNT is used to communicate to converter circuit 310 the number of pulses that are to be output. COUNT is also used to monitor the upper limit of the number of output pulses associated with each state machine clock cycle (4 KHz). There are two factors that limit the maximum allowable pulse rate of the converter: the maximum clock frequency which is 4 MHz in the present embodiment and the size of the COUNT register. The maximum pulse rate is one half of the clock rate. The maximum gain in pulse rate is set by the maximum number of counts that can be stored in COUNT. For example, a 3 bit counter would allow an 8× gain in pulse rate which translates to a 32 KHz pulse rate for a 4 KHz computation rate (F1). In the present embodiment, the COUNT register is an 8-bits register. This allows a pulse rate gain of 256, which results in a limit of about 1 MHz when F1 is 4 KHz. In step 415, calculation engine 309 monitors the 4 KHz clock to determine whether a predetermined clock edge signifying the start of a “new” computation cycle has been received. When such predetermined clock edge is received, the newly received voltage value V and current value I are multiplied together to determine the power P (wherein P=V*I) (step 420). The value P represents the amount of energy used during the last computation cycle. In step 425, the total energy consumption E is updated by adding the value of P to the present total energy consumption E. Next, by dividing the new total energy consumption value E by the threshold T, the derived quotient N representing the number of pulses corresponding to the energy E is determined (step 430). In the present embodiment, the value N is truncated to only integers. In step 435, the COUNT value is updated to indicate the number of pulses required to represent the energy consumed since the last pulse output. When the COUNT value reaches 256 ($2^8$), COUNT is wrapped to zero as indicated by the modulus function MOD associated with step 435. Next, the total energy consumption E is updated to reflect the fact that the power consumption level increase associated with the value N has been accounted for by the output pulses (step 440). Following step 440, control is transferred back to step 415 and the process continues for the next 4 KHz clock cycle. The value COUNT is made available to converter circuit 310 which actually outputs the number of pulses corresponding to the increase in COUNT.

Figure 5A:
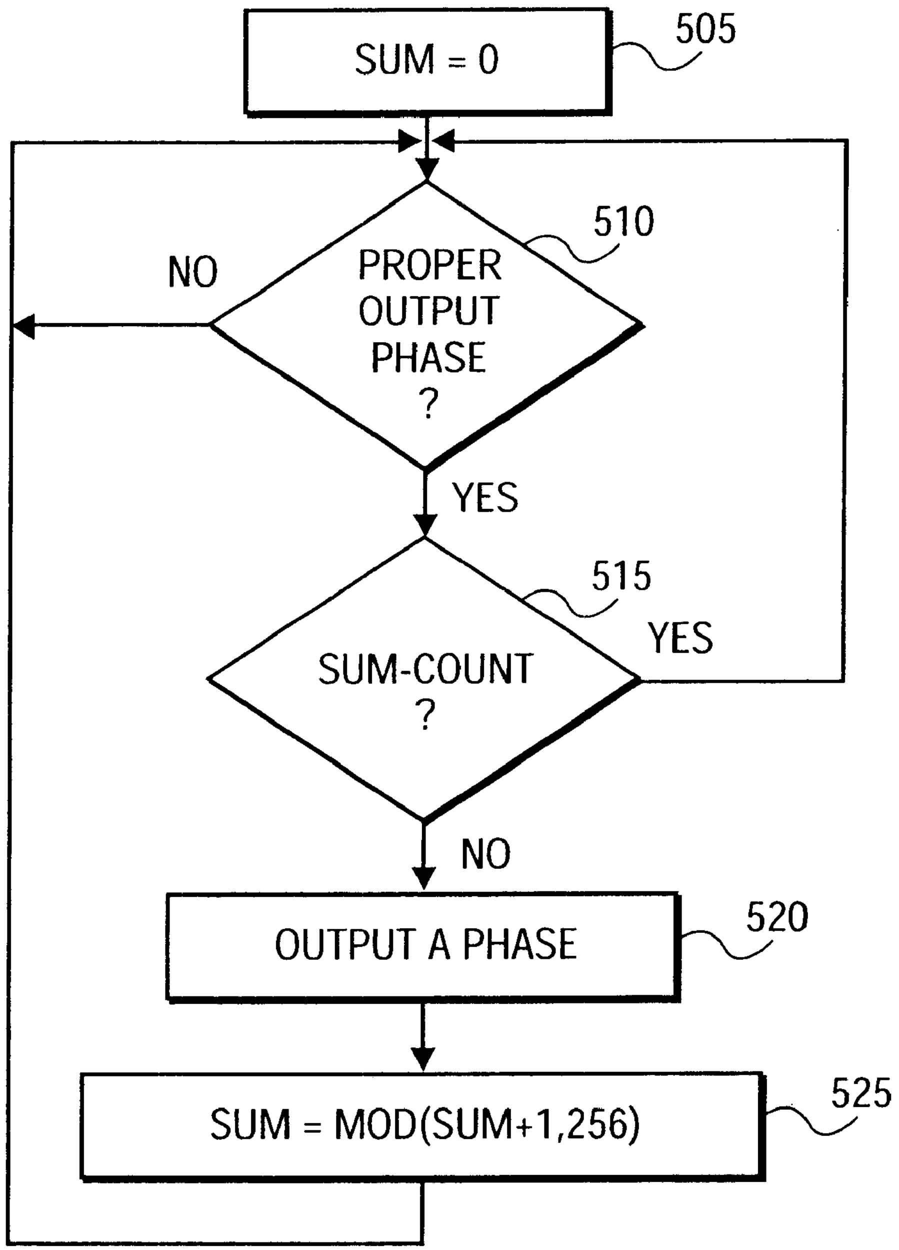
FIG. 5A is a flow chart illustrating the steps that the converter circuit of FIG. 3 performs in outputting the pulses.

Referring now to FIG. 5A, there is shown a flow chart of the steps that converter circuit 310 performs in outputting pulses, according to the present invention. According to one embodiment, the converter circuit 310 is implemented in hardware. The steps illustrated in the Figure summarize the functions of converter circuit 310, according to the present invention. According to one embodiment of the present embodiment, the converter circuit 310 is clocked at a second clock rate F2=4 MHz. According to step 505, the value SUM is set to zero (0). Converter circuit 310 uses SUM to monitor the actual number of output pulses. Next, converter circuit 310 determines the proper phase to start outputting the pulses (step 510). According to the second aspect of the present invention which is discussed in greater detail below, power meter integrated circuit 201 can be programmed to start outputting the pulses at a selected phase. This information on the selected phase is programmed and stored in a configuration register in serial interface circuit 311 that is accessible by converter circuit 310. Converter circuit 310 uses this information to determine whether a proper output phase has been reached. If the proper output phase has not been reached, converter circuit 310 continues to wait for the proper output phase. Otherwise, if the proper output phase has been reached, converter circuit 310 then determines whether the SUM value is equal to the COUNT value (step 515). If the SUM value equals the COUNT value, indicating that all the allowable output pulses allocated for the present 4 KHz clock cycle have been output, converter circuit 310 ceases outputting any additional pulses until the next 4 KHz clock cycle. Otherwise, if the SUM value is not equal to the COUNT value, converter circuit 310 outputs a pulse according to a 4 MHz clock rate (step 520). In step 525, the SUM value is updated to ensure that the total number of output pulses does not exceed the required value. When the SUM value reaches 256 ($2^8$), SUM wraps to zero (0) as indicated by the modulus function MOD associated with step 525. Following step 525, control is transferred back to step 510 and the process continues for outputting pulses.

Figure 5B:
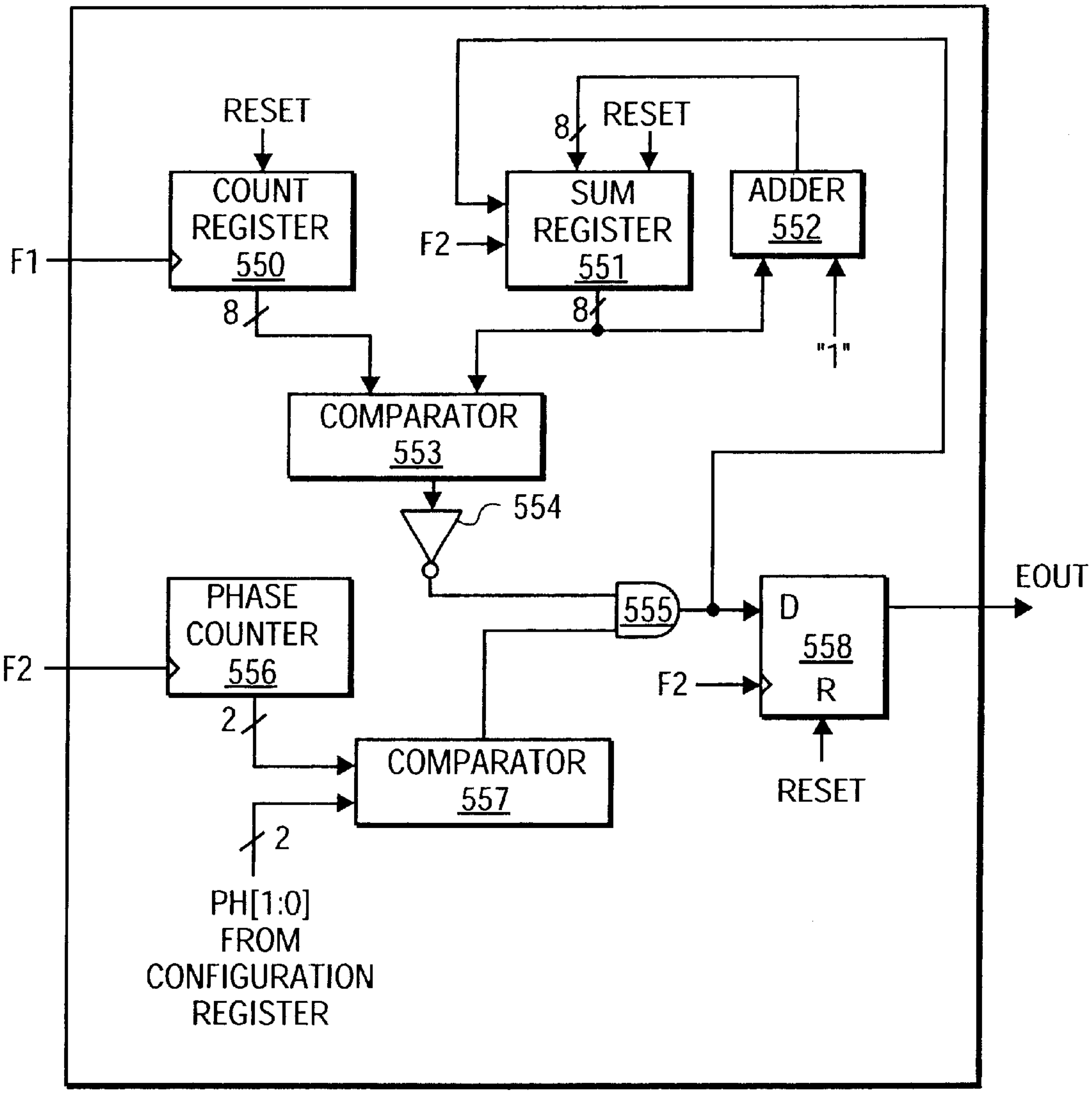
FIG. 5B is a block diagram illustrating an exemplary hardware embodiment of the converter circuit.

Referring now to FIG. 5B, there are shown, as an example, selected portions of a hardware implementation of converter circuit 310, according to one embodiment of the present invention. In particular, the converter circuit 310 comprises a COUNT register 550, a SUM register 551, an adder 552, a comparator 553, an inverter 554, an AND-gate 555, a phase counter 556, a comparator 557, and a flip-flop 558. The phase counter 556, which is driven by the 4 MHz (F2) clock, is used to count the clock pulses of the F2 clock. Phase counter 556 cycles through the phases and provides the current phase as an input to comparator 557. Comparator 557 receives as a second input bits PH[1:0] from the configuration register. As discussed in greater detail below, bits PH[1:0], which in the present embodiment reside in the configuration register of serial interface 311, are used to select the desired phase for the output pulses. Accordingly, when the phase count reaches the value represented by bits PH[1:0], comparator 557 outputs a HIGH signal to indicate that the proper time has come to output the pulse. When the phase count is yet to reach the value represented by bits PH[1:0], comparator 557 outputs a LOW signal. The output from comparator 557 is provided as an input to AND-gate 555. COUNT register 550 is clocked by the F1 clock signal (4 KHz). The content (output) of COUNT register 550 is provided as an input to comparator 553. SUM register 551 is clocked by the F2 clock signal (4 MHz). SUM register 551 is enabled when the output of AND-gate 555 is HIGH. The content (output) of SUM register 551 is provided as a second input to comparator 553. Comparator 553 compares the content of SUM register 551 against the content of COUNT register 550. If the content of SUM register 551 is not equal to the content of COUNT register 550 indicating that all the allowable output pulses allocated for the present 4 KHz clock cycle have not been output, comparator 553 outputs a LOW signal. Otherwise, if the content of SUM register 551 is equal to the content of COUNT register 550, comparator 553 outputs a HIGH signal. Inverter 554 inverts the output of comparator 553 before providing it as a second input to AND-gate 555. In so doing, AND-gate 555 only outputs a HIGH signal when the clock pulse count from phase counter 556 reaches the value represented by bits PH[1:0] and the content of SUM register 551 is not equal to the content of COUNT register 550. The output of AND-gate 555 is provided as input to flip-flop 558 and SUM register 551. In the present embodiment, flip-flop 558 is a D-type flip-flop that is clocked by the clock signal F2 (4 MHz). Flip-flop 558 can be reset by a reset signal RSET. Flip-flop 558 outputs pulse signal EOUT. As mentioned earlier, the output of AND-gate 555 is also used to enable SUM register 551. Adder 552 is used in conjunction with SUM register 551 to implement the modulus function (e.g., SUM=MOD (SUM+1, 256)). More particularly, when the SUM value reaches 256 ($2^8$), SUM is wrapped to zero. Accordingly, adder 552 receives as input the output of SUM register 551. Adder 552 receives as a second input the value 1. The output of adder 552 is provided as an input to SUM register 551 to update its content.

In accordance with one aspect of the present invention, a power meter integrated circuit is programmed to output pulses at a selected phase. The desired phase is communicated to the power meter integrated circuit through a communication interface circuit and is stored in a configuration register located in the RAM inside the serial interface circuit. In the present embodiment, the select phase information is stored in bits PH[1:0] in the configuration register which is accessible to converter circuit 310. Using the select phase information contained in bits PH[1:0], converter circuit 310 provide an output pulse signal in the desired phase.

Figure 6:
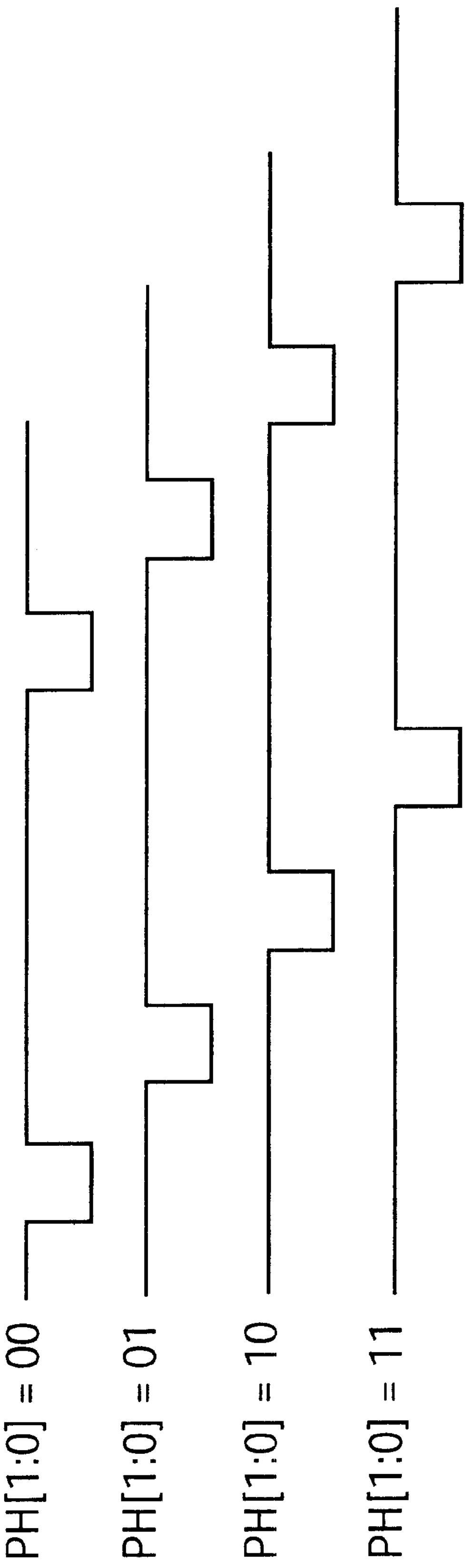
FIG. 6 is a timing diagram illustrating as examples the waveforms of a number of output pulse signals each having a different select phase that are output by the power meter integrated circuit, in accordance to a second aspect of the present invention.

Referring now to FIG. 6, there are shown waveforms of a number of output pulse signals each having a different select phase. The first waveform is an output frequency signal when PH[1:0]=00. The second waveform shows the shape of an output frequency signal when PH[1:0]=01. The third waveform shows an output frequency signal when PH[1:0]=10. Finally, a fourth waveform is shown representing an output frequency signal when PH[1:0]=11. As shown, by setting bits PH[1:0], each waveform has a different phase. This prevents the pulses (trough) of the waveforms from overlapping each other at any time. Because a pulse from a waveform does not overlap with another pulse from any other waveform, when the output pulse signals generated by power meter integrated circuits 251–253 are combined (added) by processor 257 in a multiple-phase and multiple-wire power meter such as power meter 200' to represent the total power consumption, information loss may be prevented without requiring the use of a processor to combine the different signals. Rather, according to one embodiment, a simple pull-up resistor acting as a wired AND-gate (such as that illustrated in FIG. 2B) is used to combine the signals.

The value of the threshold according to the present invention depends on the desired output frequency. It is a scaling factor between the power value and the frequency value. Generally, the bigger you make the threshold, the lower the frequency is going to be on the E-to-P converter. The present embodiment accommodates a plurality of operational requirements. A high frequency embodiment permits fast calibration. A low frequency embodiment according to the present invention permits driving a stepper motor which is inoperable at higher frequencies. The threshold is the inverse of the frequency (e.g., the higher the threshold, the lower the frequency). When the threshold is met, T is subtracted from E and at most one pulse (if the threshold is met) is output. So if the V*I calculation is performed quickly, a pulse may be output more quickly but still no more than one pulse can be generated at any time. According to the present invention, a 100–200 fold or more increase in frequency is possible assuming the same V and I calculation limitation remains the same. The INT function means that you truncate everything after the decimal point. For example, INT(0.5)=0 and INT(0.6)=0. N is a variable which is equal to the multiple value INT(E/T). N is then used to count the number of pulses to be output at the end of each V*I calculation. According to the present invention, a computation engine supports a division operator, eliminating the need for significant additional hardware. Division according to the present invention is simpler than interpolation. An interpolator is often a low pass filter which is generally more complex depending on the order of the filter. According to the present invention, more than one pulse can be output per calculation. According to the present invention, if E gets much larger than T, then division determines how many corresponding pulses are needed to be put out before the next calculation comes along to properly represent the amount of energy. It can be up to 256 (8 bits). The more bits (and hence the higher count), the longer the division takes and the larger the register needed. Two counters are used according to the present invention, to communicate information between the high frequency section and the low frequency section of the circuitry according to the present invention. The MOD command means that it is a modulus operation (i.e., wrap around upon reaching a predetermined limit). For example, in a MOD 4 operation, after completing the count 0, 1, 2, 3, operation goes back to 0. With an 8-bit counter, the wrap around is after 55. Accordingly, low speed calculations can be implemented at 4 KHz. The two registers are used to communicate between the high speed and the low speed sections (i.e., to keep track of each other). One register is running at the low speed which is incremented by N, and the second register is running at the high speed which is incremented by 1 each time a pulse is produced at the output. When the content of the second register is equal to that of the first counter, the output pulses are halted. The low speed section is done in software according to the present invention while the high speed section is done using a counter with a high speed clock. There may be synchronization signals passed between the low and high speed sections and they are used for reset purposes. The state machine for the low speed calculation takes the low speed counter and the high speed clock controls the high speed counter. The state machine for the high speed section looks at the content of the two counters and decides when to stop outputting pulses. This state machine includes a counter and a comparator. The ratio of 4 MHz to 4 KHz is 1000 but the limiting factor is the modulus counter (8 bits). If it is a bigger counter then you can have a 1000 fold improvement according to the present invention, because such clocks are available.

In power distribution, often three lines with three different phases are employed. The voltage is essentially a sine wave. The sine waves in these three lines are not in phase with each other for the purpose of power efficiency. When the information carried by these three wires is combined, a measure of the total power consumption is achieved. Thus, three circuits are needed to measure the total power consumption in a three phase system. Without synchronized phasing of the pulses, the difficulty of complex interfacing is faced. According to the present invention, a phase is assigned to each line, so the pulse that comes out will be timed differently without overlap. The calculations take place on the chip for the measuring circuit according to the present invention. The circuits of each chip are in sync with each other, being derived from the same clock. Each circuit measures power the same way, and performs the same basic calculation, according to the present invention. The E-to-P pulses are output from each chip, and each chip is assigned a different time slot. This allows the pulses to be combined by simply wiring together the circuits (without using any gate at all), since there is no overlapping pulses. When combined according to the present invention, it looks like a trebled frequency. No logic is required for the combination. There is no requirement according to the present invention to tie the lines to a micro-controller or to do the counting and calculations in a complex fashion.

In a typical current residential meter, a transformer sums together the power supply coming down first and second lines. In other words, the current is being added together by the transformer. Also, the voltage is measured between a neutral line N and the second line. In a typical current industrial meter, a global signal called neutral is referenced. Further, there is a configuration register inside the power meter to program the particular phase for the pulse output. A differential signal for each voltage is needed, as well as the current coming into a power meter circuit. The power calculation engine does all the calculations involved in the present invention (e.g., V*I, E/T, and E=E+V*I). In the preferred embodiment of the present invention, we have the power meter circuit connected to a processor but according to other embodiments of the present invention, no connection to a processor is needed. The processor is used to drive the LCD and the communication link. No processor is needed according to the present invention to provide the EOUT and EDIR signals directly to the LCD that has the ability to interpret the energy pulses, or can act as a bus master. The configuration information may also be downloaded from an external EPROM with a few extra gates. According to the present invention, the calculation engine does the low speed loop and the E2P converter does the high speed loop. The calibration RAM stores constants such as offset voltage, gain error, etc. It holds calibration information as well as the divider constant for the clock, and various constants for scaling, etc. The calibration RAM may reside inside the serial interface. It can be used for the different registers. EDIR and EOUT do not come out of the serial interface but from the E2P converter. For the current input, there are two gain ranges, the ×10 range and the ×50 range. Even though this is called the current input, actually a converted voltage is measured. A sensor is relied upon to translate the current into a voltage within the gain range of the amplifier. The sensor may be a shunt resistor or a current transformer. The different gains are used to accommodate the case where a shunt resistor is used and the case where a current transformer is used. The modulator converts the analog signal to the digital signal (bit stream). When you do that, quantization noise is introduced into the signal. With a higher order modulator, you'll get a lower noise level. In our application, low noise is needed on the current input that is because the current dynamic range is so much greater than the voltage dynamic range. The current range has a dynamic range of 150:1, and the voltage range is at about 2:1. To meet our noise requirement, a $4^{th}$ order delta sigma modulator is used to reduce the quantization noise. A digital filter is used to do a first pass of filtering of the quantization noise of the bit stream and to change from a single bit to a multiple bits representation. The HP filter is then used to eliminate the DC noise. The calculation engine talks to both the E2P filter and the serial interface. The E2P converter is an alternative output device. If you don't go through the E2P converter, you don't get the high speed pulses according to the present invention. One counter is placed inside the calculation engine, and the other counter is placed in the E2P converter, according to the present invention. For voltage input, a ×10 amp is used, because gaining up the voltage signal is desired up to an acceptable input level for the modulator. The input signal is limited to a low level of 250 mV to enable measurements below ground. A VREFIN+ signal is used as a reference for comparison purpose in performing measurements. An on-chip reference (VREFOUT) is provided according to one embodiment of the present invention, but according to another embodiment, a more accurate external reference (VREFIN+) is used. The VREFIN+ connection can be connected to the VREFOUT output. According to the present invention, a monitor circuit is used to detect brown-out conditions or a power failure condition on the power line, to allow the chip time to save critical data such as sum etc., before the power goes away.

According to a preferred embodiment of the present invention, an energy-to-pulse converter has an improved output frequency range and can eliminate the potential information loss in a multiple-wires and multiple-phases power distribution system, without added complex hardware. While the present invention has been described in particular embodiments, the present invention should not be construed as limited by such embodiments, but rather construed according to the below claims.

What is claimed is:

1. An energy-to-pulse converter comprising:

a computation engine, clocked at a first clock frequency F1, to receive a first plurality of bits representing current from a power system and a second plurality of bits representing voltage from the power system to compute a power P value from the first plurality of bits and the second plurality of bits, to monitor an energy consumption E using the computed power P value, to divide the energy consumption E by a threshold T value to calculate a quotient, to derive an integer value N from the quotient to determine a number of pulses N corresponding to the energy consumption E, and to update the energy consumption E to account for the number of pulses N to be output; and a converter circuit coupled to the computation engine to output in a clock cycle the number of pulses N at a second clock frequency F2.

2. The energy-to-pulse converter of claim 1 further comprising:

a first analog-to-digital converter (ADC) to receive as input an analog current signal from the power system and to convert the analog current signal into the first plurality of bits; and a second ADC to receive as input an analog voltage signal from the power system and to convert the analog voltage signal into the second plurality of bits.

3. The energy-to-pulse of claim 2 further comprising a serial interface circuit coupled to the converter circuit to transmit and receive signal data from and to the energy-to-pulse converter, the serial interface circuit having a configuration register to store information on a select output phase received from an external source.

4. The energy-to-pulse converter of claim 3, wherein the first ADC comprises a $4^{th}$ order delta-sigma modulator.

5. The energy-to-pulse converter of claim 4, wherein the second ADC comprises a $2^{nd}$ order delta-sigma modulator.

6. An energy-to-pulse converter coupled to a power system, the energy-to-pulse converter comprising:

a computation engine to receive a first plurality of bits representing current from the power system and a second plurality of bits representing voltage from the power system, to compute a power P value from the first plurality of bits and the second plurality of bits at a first clock frequency F1, to monitor an energy consumption E using the computed power P at the first clock frequency F1, to divide the energy consumption E by a threshold T value at the first clock frequency F1 to calculate a quotient, to derive an integer value N from the quotient at the first clock frequency F1 to determine a number of pulses N corresponding to the energy consumption E, to update the energy consumption E at the first clock frequency to account for the number of pulses N to be output, and to output in a clock cycle the number of pulses N at a second clock frequency F2.

7. The energy-to-pulse converter of claim 6 further comprising:

a first analog-to-digital converter (ADC) to receive as input an analog current signal from the power system and to convert the analog current signal into the first plurality of bits; and a second ADC to receive as input an analog voltage signal from the power system and to convert the analog voltage signal into the second plurality of bits.

8. The energy-to-pulse converter of claim 7 further comprising a serial interface circuit coupled to the computation engine to transmit and receive serial data from and to the energy-to-pulse converter, the serial interface circuit having a configuration register to store information on a select output phase received from an external source.

9. The energy-to-pulse converter of claim 8, wherein the first ADC comprises a $4^{th}$ order delta-sigma modulator.

10. The energy-to-pulse converter of claim 8, wherein the second ADC comprises a $2^{nd}$ order delta-sigma modulator.

11. A power meter comprising:

a power supply coupled to a power system for supplying power; and a plurality of energy-to-pulse converters coupled to the power system, the plurality of energy-to-pulse converters comprising:

a computation engine, clocked at a first clock frequency F1, to receive a first plurality of bits representing current from the power system and a second plurality of bits representing voltage from the power system, to compute a power P value from the first plurality of bits and the second plurality of bits, to monitor an energy consumption E using the computed power P value, to divide the energy consumption E by a threshold T value to calculate a quotient, to derive an integer value N from the quotient to determine a number of pulses N corresponding to the energy consumption E, and to update the energy consumption E to account for the number of pulses N to be output; and a converter circuit coupled to the computation engine to output in clock cycle the number of pulses N at a second clock frequency F2, wherein the converter circuit is programmable to output each of the pulses N at a selectable phase.

12. The power meter of claim 11, wherein the energy-to-pulse converters further includes:

a first analog-to-digital converter (ADC) to receive as input an analog current signal from the power system and to convert the analog current signal into the first plurality of bits; and a second ADC to receive as input an analog voltage signal from the power system and to convert the analog voltage signal into the second plurality of bits.

13. The power meter of claim 12 further comprising a micro-processor coupled to the anergy-to-pulse converters and the power supply, the micro-processor serving as a bus master.

14. The power meter of claim 13, wherein the energy-to-pulse converters further includes a serial interface circuit coupled to the converter circuit to transmit and receive serial data from and to a corresponding energy-to-pulse converter, the serial interface circuit having a configuration register to store information on the select output phase received from the micro-processor.

15. The power meter of claim 14 further comprising a communication interface circuit coupled to the processor to link the power meter to a communication network.

16. An energy-to-pulse converter comprising:

a computation engine, clocked at a first clock frequency F1, to receive a threshold T value, a first plurality of bits representing current from a power system, and a second plurality of bits representing voltage from the power system, to compute a power P value from the first plurality of bits and the second plurality of bits, to monitor an energy consumption E using the computed power P value, to divide the energy consumption E by the threshold T value to calculate a quotient, to derive an integer value N from the quotient to determine a number of pulses N corresponding to the energy consumption E, and to update the energy consumption E to account for the number of pulses N to be output; and a converter circuit coupled to the computation engine to output in a clock cycle the number of pulses N at a second clock frequency F2, wherein the second clock frequency F2 is higher than the first clock frequency F1.

17. An energy-to-pulse converter comprising:

a computation engine, clocked at a first clock frequency F1, to receive a threshold T value, a first plurality of bits representing current from a power system, and a second plurality of bits representing voltage from the power system, to compute a power P value from the first plurality of bits and the second plurality of bits, to monitor an energy consumption E using the computed power P value, to divide the energy consumption E by the threshold T value to calculate a quotient, to derive an integer value N from the quotient to determine a number of pulses N corresponding to the energy consumption E, and to update the energy consumption E to account for the number of pulses N to be output;

a converter circuit coupled to the computation engine to output in a clock cycle the number of pulses N at a second clock frequency F2; and a power monitor circuit to monitor a power condition of the power system.

18. The energy-to-pulse converter of claim 17, wherein the power monitor circuit to detect a brownout condition of the power system.

19. The energy-to-pulse converter of claim 17, wherein the power monitor circuit to detect a power failure condition of the power system.

20. A power meter comprising:

a communication interface unit to receive output phase selection information identifying a selected phase; and an energy-to-pulse converter coupled to the communication interface unit comprising:

a computation engine to receive a first plurality of bits representing current from a power system and a second plurality of bits representing voltage from the power system, to compute a power P value from the first plurality of bits and the second plurality of bits, to monitor an energy value E using the computed power P value, to divide the energy value E by a threshold T value to calculate a quotient, to derive an integer value N from the quotient to determine a number of pulses N corresponding to the energy value E, and to update the energy consumption E to account for the number of pulses N to be output; and a converter circuit coupled to the computation engine to output in a clock cycle the number of pulses N corresponding to the energy value E at the selected phase.

21. The power meter of claim 20, wherein the energy-to-pulse converter further comprises a configuration register to store the output phase selection information.

22. The power meter of claim 20, wherein the converter circuit further comprises:

a phase counter to identify a current phase of the number of pulses N corresponding to the energy value E; and a comparator to compare the current phase of the number of pulses N corresponding to the energy value E with the selected phase.

23. The power meter of claim 20 further includes a plurality of energy-to-pulse converters, the power meter further comprising a pull-up resistor to combine a number of pulses N corresponding to an energy value E from each of the plurality of energy-to-pulse converters.

* * * * *